DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

Published March 16, 1971

884 O.G. 733

T884,012

INJECTION VALVE

Herbert Blades, Hockessin, Del., and Donald W. Johnson, Donelson, Tenn., assignors to E. I. du Pont de Nemours and Company, Wilmington, Del.

Filed Feb. 3, 1970, Ser. No. 8,354
**Int. Cl. F16k *17/04***
U.S. Cl. 137—541
1 Sheet Drawing. 4 Pages Specification

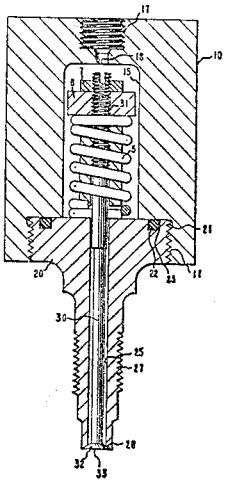

An injection valve that includes a body having inlet and outlet ends connected by a passage which has successive cylindrical and tapered lengths. A stem having a cylindrical portion somewhat smaller than the cylindrical length of the passage and a tapered portion that matches the tapered length of the passage extends into the passage. A biasing means connected between the valve body and the stem urges the tapered portion of the stem into engagement with the tapered length of the passage to seal and close off the passage at the outlet end.

March 16, 1971 H. BLADES ET AL T884,012
INJECTION VALVE
Filed Feb. 3, 1970
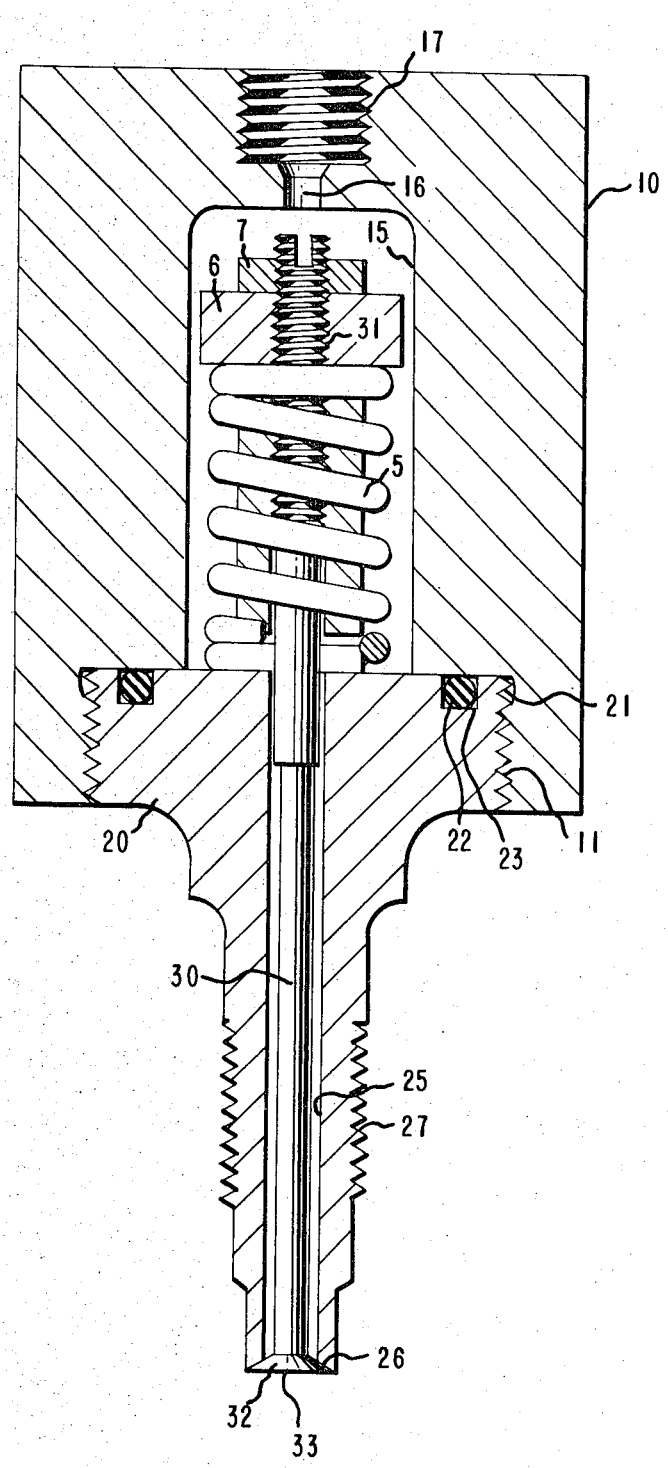
INVENTORS
HERBERT BLADES
DONALD W. JOHNSON
BY Howard P. West Jr.
ATTORNEY